H. L. THURMOND.
TRAILER.
APPLICATION FILED APR. 4, 1919.
1,330,289. Patented Feb. 10, 1920.
2 SHEETS—SHEET 1.
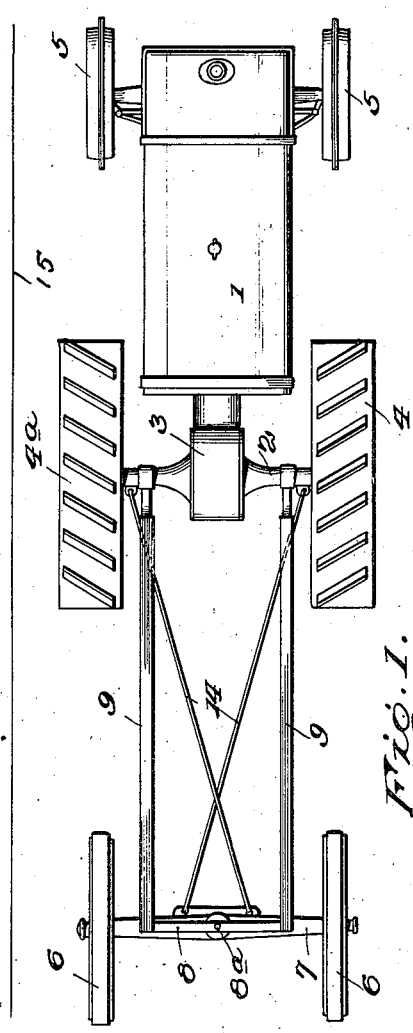
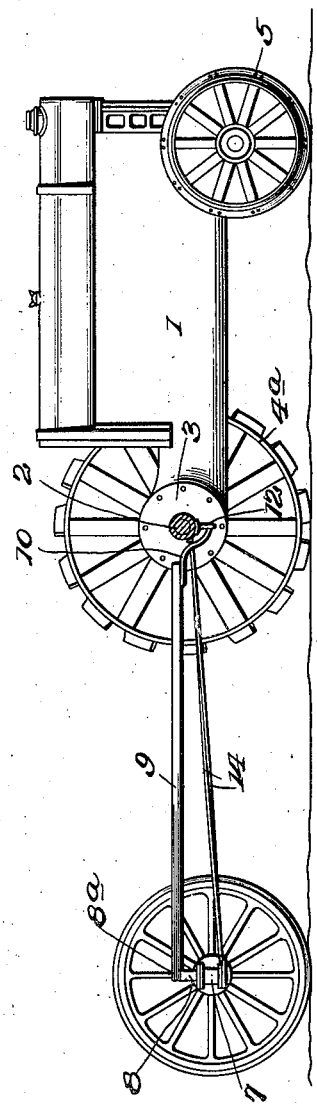
Inventor
H. L. Thurmond
by,
Attorney.

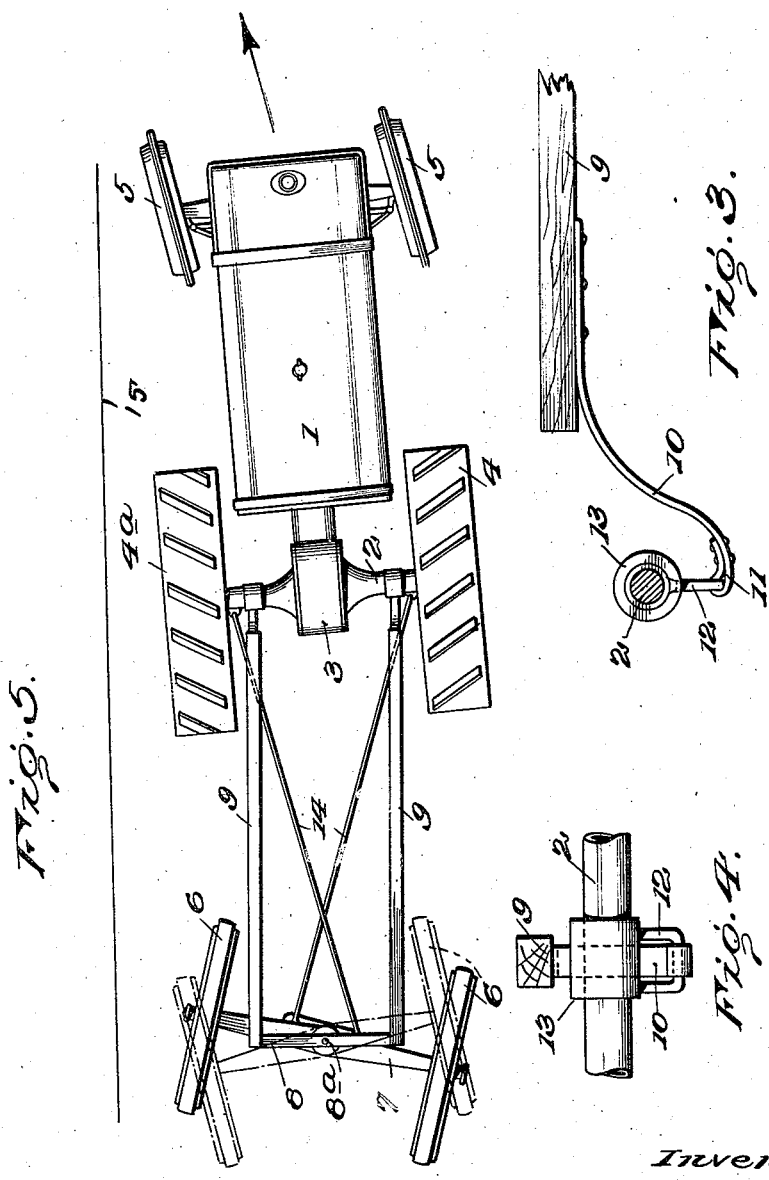

UNITED STATES PATENT OFFICE.

HERBERT L. THURMOND, OF EAST STANWOOD, WASHINGTON.

TRAILER.

1,330,289.  Specification of Letters Patent.  Patented Feb. 10, 1920.

Application filed April 4, 1919. Serial No. 287,419.

*To all whom it may concern:*

Be it known that I, HERBERT L. THURMOND, a citizen of the United States, residing at East Stanwood, in the county of Snohomish and State of Washington, have invented certain new and useful Improvements in Trailers, of which the following is a specification.

This invention relates to improvements in trailers, and particularly a trailer designed to be connected to a tractor and so constructed as to provide for controlling the steering direction of the trailer wheels to insure a proper direction of movement of the trailer, particularly in backing.

The improved trailer is designed for connection to the rear axle of the tractor or other motive vehicle, so that the trailer wheels, arranged on the usual king-bolt mounted axle will ordinarily be properly steered in all forward movements, while the normal steering action of such trailer wheels when backing may be changed from a normal following movement to a reversal thereof, but a slight forward movement of the tractor, to thereby permit such trailer wheels to be disposed in the proper backing.

The invention also contemplates an additional function for the connection between the reach bars of the trailer and the rear axle of the tractor, in that by said connection the trailer load has direct effect upon the traction wheels, to increase the tractive power in accordance with the load.

In the drawings:—

Figure 1 is a plan view showing the improved trailer connected to a tractor.

Fig. 2 is a side elevation of the same.

Fig. 3 is a detail in elevation, partly in section illustrating the connection between the trailer and the rear axle housing of the tractor.

Fig. 4 is an end view of the same.

Fig. 5 is a view similar to Fig. 1 illustrating the steering action of the trailer.

The improved trailer is designed to be connected to any motive vehicle, the one illustrated being of the Fordson type, the essential parts of which for the purpose of this description is the body 1, the rear axle housing 2, the differential 3, the tractor wheels 4 and 4ª, and the front or steering wheels 5.

The improved trailer comprises ground wheels 6 mounted upon an axle 7 on which through the usual king bolt 8ª, is arranged the bolster 8. Reach bars 9 are secured at their rear ends to the bolster, and at their forward ends to the rear axle housing 2 of the tractor. The connection between the axle housing 2 and the reach bars 9 is an important detail of the present invention, and must for the result to be secured be such as to permit independent longitudinal movement of the reach bars with respect to the axle housing without relieving said axle housing at any time of the trailer load strain on said reach bars. It is to be understood that many simple types of connections may be used for this result, and while many such are contemplated, the one at present preferred and here illustrated comprises comparatively broad ring members 13, somewhat loosely fitting the axle housing, and from each of which, in normal position depends an eye 12. A spring connection is provided intermediate the reach bar and eye 12 such being here shown as a spring strip 10, secured at its rear end to the under side of the reach bar, and looped at its forward end at 11, to loosely engage the eye 12. Truss bars 14 are connected at the forward ends to the axle housing 2 and at their rear ends to the trailer axle 7, the truss rods being cross as shown.

In forward travel when turning the truss rods will in an obvious manner insure a proper steering action of the trailer wheels. If this connection were the only parts in action in the backing operation the steering action of the trailer wheels would be exactly reversed from that desired. This will be plain from Fig. 5 as it will be apparent that in attempting to back the trailer toward, for example, a curb line indicated at 15 the angular arrangement of the steering wheels 5 compel the traction wheel 4 to travel a greater distance than the traction wheel 4ª. This through the natural and different relative movement of the truss rods 14 would dispose the wheels of the trailer in the positions indicated in dotted lines in Fig. 5 when the tractor is backed toward the curb, from the position shown in Fig. 1. This is of course away from the curb line if at this point the tractor is reversed and moved slightly forward without disturbing the steering inclination of the wheels 5, the greater distance movement of the traction wheel 4, at once reverses the steering relation of the trailer wheels and they are now arranged for proper movement toward the curb line as shown in full lines in Fig. 5. In this movement the bearing ring 13 of this reach bar connection adjacent the wheel 4 will turn on the axle housing to move the eye 12 toward the rear and thus lengthen said reach bar, while the similar connection adjacent the wheel 4ᵃ will move in the opposite direction with the effect of shortening the reach bar length on this side. When the tractor is backed from the position shown in Fig. 5, the trailer wheels of course will now move the trailer toward the curb line.

The reach bars 9 are adapted to support the load of the trailer, and may have the usual box body (not shown) secured thereon for this purpose. Any load on said reach bars will as is apparent through the particular type of connection between said bars and the tractor axle housing 2 be communicated to said axle housing, directly proportional as the load, to thereby increase the tractive power of the traction wheels in accordance with the load.

What is claimed as new is:—

1. A trailer for connection to a motive vehicle comprising a wheel supported axle, a bolster pivotally mounted thereon, crossed truss rods connected to the axle and to the motive vehicle, reach bars connected at one end to the bolster, and means independently and movably connecting the forward ends of the reach bars to the motive vehicle.

2. A trailer for connection to a motive vehicle comprising a wheel supported axle, a bolster pivotally mounted thereon, crossed truss rods connected to the axle and to the motive vehicle, reach bars connected at one end to the bolster, and means independently and movably connecting the forward ends of the reach bars to the motive vehicle, said means comprising members mounted for rotative movement on a part of the motive vehicle, eyes extending from said members, and connections between said eyes and the reach bars.

3. A trailer for connection to a motive vehicle comprising a wheel supported axle, a bolster pivotally mounted thereon, crossed truss rods connected to the axle and to the motive vehicle, reach bars connected at one end to the bolster, and means independently and movably connecting the forward ends of the reach bars to the motive vehicle, said means comprising members mounted for rotative movement on a part of the motive vehicle, eyes extending from said members, and spring strips secured to the reach bars and having looped connections with said eyes.

In testimony whereof I affix my signature.

HERBERT L. THURMOND.